May 7, 1929.　　　　C. H. SAYRE　　　1,712,310
WEAR COMPENSATING BEARING
Filed March 19, 1928
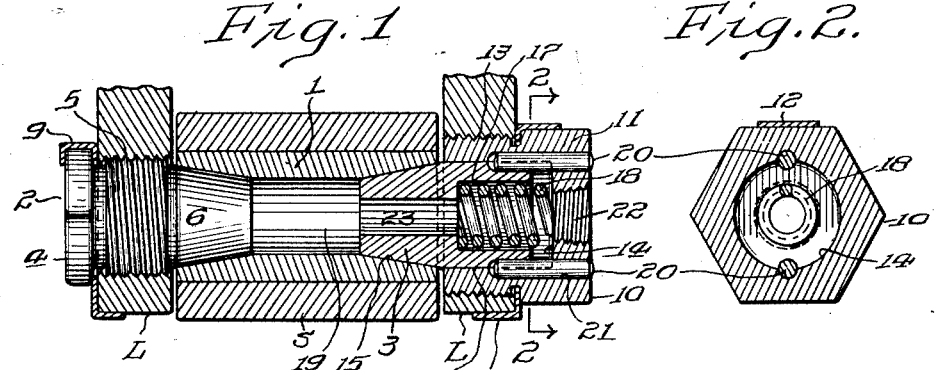
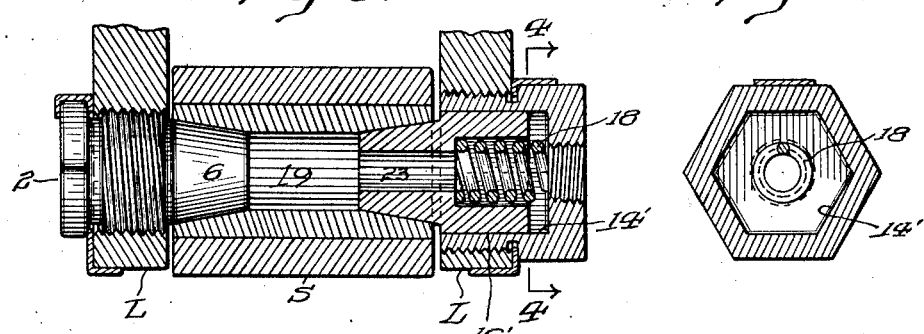
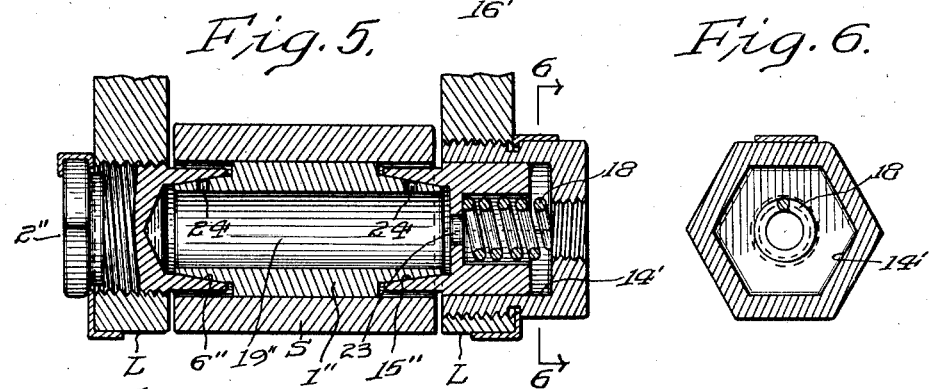
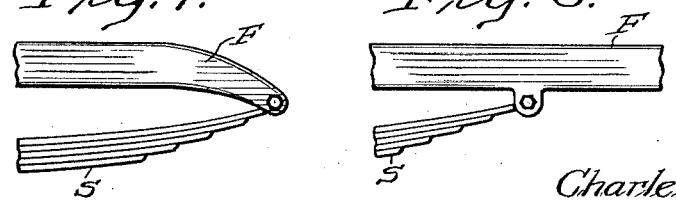
INVENTOR
Charles H. Sayre.
BY
ATTORNEYS
WITNESS Patented May 7, 1929.

1,712,310

UNITED STATES PATENT OFFICE.

CHARLES H. SAYRE, OF ELMIRA, NEW YORK.

WEAR-COMPENSATING BEARING.

Application filed March 19, 1928. Serial No. 262,668.

In modern automotive practice it is customary to attach the forward ends of the front springs directly to the forward end of the frame of an automobile without the interposition of a movable shackle but in such manner that the spring is capable of pivotal movement with respect to the frame as the former flexes under operative conditions; it is also common practice to similarly attach the forward ends of the rear springs to the frame particularly in cars in which the well known "Hotchkiss" drive is employed or, in other words, those in which the forward thrust of the rear axle is communicated to the frame through the rear springs instead of through a torque member. It has been found, however, that considerable wear takes place at these points of attachment with consequent disagreeable rattling after the car has been driven for a relatively short distance, the only effective remedy for which is the installation of new bushings and bolts from time to time.

A principal object of my invention, therefore, is to provide a wear compensating bearing suitable, among its many uses, for attaching the front ends of the springs to the frame and operative to automatically compensate for or take up such wear as may occur between the relatively moving bearing surfaces so as to eliminate looseness therebetween with consequent prevention of rattling and other noises at these points of attachment substantially during the life of the car, thus avoiding the necessity for frequent replacement of parts to maintain the requisite snugness of fit.

Further objects of my invention are to provide a wear compensating bearing which may be readily employed on existing types of automobiles or other machinery for various purposes as, for example, for attaching the front ends of the springs of an automobile to the frame thereof without material alteration or reconstruction of the car and to provide a bearing of this character having adequate bearing area between the relatively moving bearing surfaces and in which the parts are of sufficient size to afford the requisite strength to sustain the required load yet in which the external dimensions of the parts are not increased to a point which would prevent the use of the bearing in automobiles designed for the plain bearings ordinarily employed, thus enabling bearings constructed in accordance with the present invention to be utilized either as factory equipment on new cars or for replacement purposes on old cars without material alteration or modification of the design thereof.

A still further object of my invention is to provide a wear compensating bearing of simple design and construction and comprising but a relatively small number of parts of a character suitable for efficient and economical manufacture, whereby my improved bearing may be employed without material increase in cost over the plain bearings ordinarily utilized for similar purposes.

My invention further includes other objects and novel features of design, construction and arrangement hereinafter more particularly mentioned or which will be apparent from the accompanying drawings in which I have illustrated certain forms of bearings embodying the principles of my invention.

While, as hitherto stated, bearings constructed in accordance with my invention are well adapted for installation at the points of attachment of the forward ends of automobile springs to the frame of the automobile, they may, with equal facility and advantage, be employed for other purposes as, for example, in the steering knuckles or front axle spindle bearings of an automobile or at the points of connection of the cross tie rod with the steering arms in the steering mechanism of an automobile, and it will thus be understood that while I have illustrated in the said drawing and will herein more particularly refer to certain forms of the invention adapted for connecting the spring and frame as aforesaid I do not thereby desire or intend to limit the use of the invention to that purpose alone.

In said drawing, Fig. 1 is a vertical central section showing one form of my improved bearing as employed to operatively connect an end of one of the springs with the frame of an automobile and Fig. 2 is a vertical section on line 2—2 in Fig. 1 looking in the direction of the arrows. Figs. 3 and 4 are views respectively corresponding to Figs. 1 and 2 but showing a slightly different form of bearing, while Figs. 5 and 6 similarly illustrate a still different form of bearing. Fig. 7 is a fragmentary side elevation on a reduced scale showing the front end of an automobile frame and front end of the forward spring attached thereto by a bearing constructed in accordance with my invention, and Fig. 8 is a similar view showing the forward end of the rear spring similarly attached to a lug or bracket depending from the car frame. The same symbols are used to designate corresponding parts in the several figures.

Referring now more particularly to that form of the invention illustrated in Figs. 1 and 2, L—L represent laterally spaced depending ears or lugs forming integral parts of or permanently attached to the frame F and between which the end of the spring S is disposed. The spring is provided in the ordinary manner with an eye adapted to receive a bushing 1 ordinarily of cylindrical exterior contour and pressed or otherwise disposed in the spring eye so as to be operatively rigid therewith. This bushing which is usually of bronze or other suitable bearing metal is axially bored and provided adjacent its ends with outwardly and oppositely tapered bearing surfaces adapted to bear upon the bearing surfaces or regions of the spindle 2 and sliding bushing 3 when the parts are operatively assembled. This spindle 2, which is preferably formed from a single piece of metal, progressively comprises a head 4 conveniently of hexagonal contour and adapted to rest against the outer face of one of the lugs or ears L, an exteriorly threaded region 5 adapted to seat in a correspondingly internally threaded bore in the lug and a conical region 6 tapering inwardly from the threaded region in correspondence with the adjacent tapered bearing surface of the bushing 1 in which, when the parts are assembled, the conical portion of the spindle is received and thus serves to support the adjacent end of the bushing. If desired a lock washer 9 may be disposed beneath and bent up against the head 4 to prevent the spindle from rotating after it is assembled in the lug.

Support is afforded to the opposite end of the bushing, that is, the end opposite the head, through means now to be described and which comprise a sleeve nut generally designated as 10 having a head 11 desirably of hexagonal form adapted to seat against the outer face of the other ear L from that into which the spindle is threaded or against a lock washer 12 interposed between the head of the nut and face of the lug (and which is bent up in the usual way after assembly of the parts so as to prevent rotation of the nut) and an integral exteriorly threaded portion 13 adapted to be screwed into a correspondingly interiorly threaded bore in the adjacent lug. This portion 13 of the nut as well as a part of the head proper is axially bored out to provide a cylindrical cavity 14 for the reception of the outer cylindrical end of the sliding bushing 3 which is of a diameter to form a good sliding fit therein, the opposite or inner end 15 of the bushing being conical and inwardly tapered in correspondence with the tapered bore in the adjacent end of the bushing. The cylindrical or outer portion 16 of the sliding bushing is also axially bored out to form a cavity 17 which is of smaller diameter than the cavity 14 and adapted to receive a coil spring 18 which after the parts are assembled is constantly maintained in a state of compression between the ends of the cavities 14 and 17 and is thus effective to continuously urge the sliding bushing inwardly along into the spring eye bushing 1.

As hitherto stated, the ends of the bore in the spring eye bushing 1 are tapered in conformity with the tapered bearing surfaces presented by the conical region 6 of the spindle and the conical portion of the sliding bushing; between these tapered regions the bore in the bushing may be cylindrical and forms an oil or grease receiving chamber or reservoir 19 adapted to contain a relatively considerable body of a suitable lubricant thereby insuring adequate and effective lubrication of the relatively moving bearing surfaces over an extended period after the chamber has been filled.

It is thus apparent that when the parts are assembled by first positioning the spring eye 1 between the lugs L in axial alignment with the threaded bores therein, then screwing the spindle into place, slipping the sliding bushing into place, inserting the spring in the cavity of the bushing and finally screwing down the sleeve nut so as to compress the spring, an adequate and satisfactory bearing area or surface is provided for the spring eye bushing and that the spring 18 is constantly operative to urge the sliding bushing inwardly so as to compensate for any wear which may take place between the various bearing surfaces and thus continuously preserve the requisite snugness of fit.

Since in this form of the invention the end of the sliding bushing which is received in the sleeve nut is cylindrical, it is necessary to provide some means to prevent the bushing from turning in the nut for, in the absence thereof, if the frictional resistance to relative turning movement between the conical surfaces of the spring eye bushing 1 and the sliding bushing happens to be greater than that afforded to turning by the sliding bushing itself, the latter under operative conditions might merely oscillate in the sleeve nut without any relative movement taking place between the conical bearing surfaces of the spring eye bushing and the sliding bushing.

Means are therefore provided for preventing relative rotation between the nut and the bushing, the particular embodiment thereof utilized in the form of the invention now being described comprising a pair of pins 20 seated in holes 21 drilled inwardly from the outer face of the nut and at their inner ends extending into both the sleeve and the bushing as best shown in Fig. 2. Conveniently when two pins are employed they may be disposed in diametrically opposed relation. Thus after the sleeve nut is screwed into the frame lug during the process of assembly, the holes 21 in the nut may be aligned with those in the bushing and the pins then driven into place, thereby effectively preventing relative rotation between the parts. Or the pins may be first driven into the nut and the spring and bushing assembled therewith, after which the nut, carrying the bushing and the spring, can be screwed into place in the lug. If desired, the nut may be provided with an internally threaded axial bore 22 for the connection of a grease cup or lubricating nipple and the sliding bushing with an axial bore forming a lubricant passage 23 the inner end of which communicates with the chamber 19, thus enabling the convenient introduction of lubricant to the latter.

While the form of the invention heretofore described is desirable in that the sliding bushing may be readily manufactured from cylindrical stock and the cylindrical cavity 14 in the sleeve nut formed by a boring operation or the like thus minimizing the cost of production, it necessitates the use of the pins or other suitable means for preventing relative rotation between the sliding bushing and the sleeve nut. This requirement, however, is avoided in the form of the invention shown in Figs. 3 and 4 and which, therefore, may be deemed preferable under certain conditions, although ordinarily slightly more expensive to manufacture. In it the outer end 16' of the sliding bushing is of other than cylindrical cross section as, for example, of polygonal cross section, and the cavity 14' in the sleeve nut is arranged to conform thereto so that while the bushing is free to slide longitudinally in the cavity it is prevented from rotating therein. In other respects the form of the invention shown in these figures is substantially similar to that heretofore described.

In Figs. 5 and 6 still another form of the invention is shown in which the arrangement of the sliding bushing, sleeve nut and spring is substantially similar to that shown in the two preceding figures, that is, the outer end of the sliding bushing is of polygonal contour and the cavity in the sleeve nut is arranged to conform thereto. However, in this form of the invention the conical bearing surfaces on the spring eye bushing 1″ are formed on the outer surface thereof adjacent its ends instead of in its interior and are respectively tapered inwardly toward the end of the bushing, while the inner end 15″ of the sliding bushing is internally tapered in correspondence therewith so that when the parts are assembled it will seat over the adjacent end of the spring eye bushing and form a bearing therefor. Similarly, to form a bearing for the opposite end of the spring eye bushing the spindle 2″ is provided with an internally bored and tapered portion 6″ corresponding to the conical region 6 of the spindle 2 which projects beyond the inner face of the lug and is adapted to receive and form a bearing for the adjacent end of the spring eye bushing 1″ which may desirably be hollow so as to form a grease reservoir 19″ which may, if desired, be connected by suitably disposed ducts 24 with the bearing surfaces. It will be apparent that under these conditions the sliding bushing is constantly urged inwardly by the spring 18 just as in the other forms of the invention heretofore described so as to automatically take up and compensate for wear between the tapered bearing surfaces. It will of course be further apparent that in this form of the invention the outer end of the sliding bushing may be made cylindrical instead of polygonal and suitable means such as the pins 20 utilized as hitherto described to prevent its rotation in the sleeve nut.

While I have herein described and illustrated certain forms of my invention with considerable particularity it will be understood I do not thereby desire or intend to confine myself specifically thereto as modifications may be made in the form, construction and arrangement of the various parts if desired without departing from the spirit and scope of the invention as defined in the appended claims.

Having thus described my invention, I claim and desire to protect by Letters Patent of the United States:

1. In combination with a pair of spaced supporting members, a bushing having oppositely tapered bearing surfaces, an element carried by one member and having a bearing surface cooperative with one of said tapered surfaces, a slidable element having a bearing surface cooperative with the other of said tapered surfaces, an element carried by the other member and surrounding the sliding element, and expansible means interposed between said last mentioned element and the slidable element operative to continuously urge said elements apart.

2. In combination with a pair of spaced supporting members, a bushing disposed between the members and having oppositely tapered bearing surfaces, an element carried by one member having a bearing surface cooperative with one of said tapered surfaces, a hollow element carried by the other of said members, a bushing slidable in said hollow element and having a bearing surface cooperative with the other of said tapered surfaces, and a spring interposed between the bushing and the hollow element operative to constantly urge the bushing against said tapered surface.

3. In combination with a pair of spaced supporting members, a bushing disposed between the members and having oppositely tapered bearing surfaces, an element carried by one member having a bearing surface cooperative with one of said tapered surfaces, a hollow element carried by the other of said members, a bushing slidable in said hollow element and having a bearing surface cooperative with the other of said tapered surfaces, a spring interposed between the bushing and the hollow element operative to constantly urge the bushing against said tapered surface, and means operative to restrain the slidable bushing from axial rotation in the hollow element.

4. In combination with a pair of spaced supporting members, a spindle carried by one of the members, a sleeve nut carried by the other member, a bushing longitudinally slidable within the nut, the bushing and the spindle being respectively provided with tapered bearing surfaces, a bushing surrounding the spindle and the first mentioned bushing and having bearing surfaces respectively cooperative with the bearing surfaces thereon, and a spring interposed between the nut and the first mentioned bushing operative to continuously urge said bushing against the surrounding bushing.

5. In combination with a pair of spaced supporting members, a spindle carried by one of the members, a sleeve nut carried by the other member and provided with a cavity, a sliding bushing extending into the cavity, the spindle and the sliding bushing being respectively provided with tapered bearing surfaces, a bushing surrounding the spindle and the sliding bushing and having tapered bearing surfaces respectively cooperative with the first mentioned surfaces, and a spring interposed between the sliding bushing and the sleeve nut operative to continuously urge the sliding bushing in a direction to maintain the several bearing surfaces in engagement.

6. In combination with a pair of spaced supporting members, a spindle carried by one of the members and having an inwardly tapered bearing surface, a sleeve nut having a cavity and carried by the other member, a bushing slidable in the nut and having an inwardly tapered bearing surface oppositely disposed with respect to the tapered surface on the spindle, means operative to prevent axial rotation of the sliding bushing with respect to the nut, a bushing surrounding the spindle and the sliding bushing and having tapered bearing surfaces respectively cooperative with the tapered bearing surfaces thereon, and a spring interposed between the sliding bushing and the nut operative to constantly urge the sliding bushing into the surrounding bushing to maintain the respective bearing surfaces in engagement.

7. In a wear compensating bearing, a spindle adapted to be carried by a fixed support and provided with a conical bearing region, a hollow nut adapted to be carried by another fixed support, a bushing extending into the nut and having a conical bearing region, a spring interposed between the bushing and the nut operative to constantly force the bushing away from the nut, and means operative to prevent axial rotation of the bushing in the nut.

8. A wear compensating bearing comprising a spindle adapted to be carried by a fixed support and provided with a conical bearing region, a nut having a cavity adapted to be carried by another fixed support, a bushing extending into the cavity in the nut and having a conical bearing region oppositely disposed with respect to the corresponding region on the spindle and also provided with a cavity, a spring extending in both of said cavities and operative to constantly urge the bushing away from the nut, means for preventing axial rotation of the bushing with respect to the nut, and a hollow bushing surrounding both the spindle and the first mentioned bushing and having conical bearing surfaces respectively adapted to cooperate with the corresponding conical surfaces thereon.

9. In combination with relatively movable supporting members, a wear compensating bearing forming a connection therebetween and comprising a spindle carried by one part of one of said members and having a conical bearing region, a hollow nut carried by another part of said member, a bushing extending into and axially slidable in said nut and having a conical bearing region, means operative to constantly urge the bushing away from the nut and means carried by the other supporting member having conical bearing regions respectively cooperative with those on the bushing and the spindle.

10. In combination with relatively movable supporting members, a wear compensating bearing forming a connection therebetween and comprising a spindle carried by one part of one of said members and having a conical bearing region, a hollow nut carried by another part of said member, a bushing extending into said nut and having a conical bearing region, a spring interposed between the bushing and the nut and operative to constantly urge the bushing away from the nut, means operative to prevent axial rotation of the bushing in the nut and means carried by the other supporting member having conical bearing regions respectively cooperative with those on the bushing and the spindle.

In witness whereof, I have hereunto set my hand this 10th day of Mar., 1928.

CHARLES H. SAYRE.